United States Patent [19]

Smith et al.

[11] 4,068,391
[45] Jan. 17, 1978

[54] REFRIGERATION SYSTEM DEMONSTRATION DEVICE

[75] Inventors: Richard Seymour Smith, North Syracuse; Philip Abraham Hider, Syracuse, both of N.Y.

[73] Assignee: Carrier Corporation, Syracuse, N.Y.

[21] Appl. No.: 785,190

[22] Filed: Apr. 6, 1977

Related U.S. Application Data

[63] Continuation of Ser. No. 677,426, April 15, 1976, abandoned.

[51] Int. Cl.² ............................................. G09B 25/02
[52] U.S. Cl. .............................................. 35/13; 35/49
[58] Field of Search .................. 35/1, 8 R, 10, 13, 17, 35/40, 49, 53, 54; 40/106, 52; 340/225

[56] References Cited

U.S. PATENT DOCUMENTS

| | | |
|---|---|---|
| 2,173,400 | 9/1939 | Shaw .................................... 35/49 |
| 2,203,594 | 6/1940 | Daugherty ......................... 35/13 X |
| 3,197,903 | 8/1965 | Walley ................................ 35/13 X |
| 3,277,586 | 10/1966 | Long ......................................... 35/1 |
| 3,608,222 | 9/1971 | Kock .................................... 35/1 X |
| 3,688,008 | 8/1972 | Kreiger ................................... 35/17 |

*Primary Examiner*—Harland S. Skogquist
*Attorney, Agent, or Firm*—J. Raymond Curtin

[57] ABSTRACT

A demonstration device for simulating the operation of a heat pump system comprising a schematic representation of a heat pump system, a plurality of lamps and associated electrical circuitry adapted to illuminate portions of the schematic representation to simulate the operation of the heat pump system in various modes of operation, and to simulate refrigerant flow and the phase state and temperature of the refrigerant at different places in the system, and associated explanatory panels for alternatively demonstrating the operation of the electrical circuitry of the heat pump system, or indicating the mode of operation of the system.

13 Claims, 3 Drawing Figures

REFRIGERATION SYSTEM DEMONSTRATION DEVICE

This is a continuation of application Ser. No. 677,426 filed Apr. 15, 1976 which application is now abandoned.

BACKGROUND OF THE INVENTION

The present invention relates to teaching and display devices, and in particular to devices for demonstrating the operation of refrigeration systems.

DESCRIPTION OF THE PRIOR ART

The teaching of the operation of refrigeration systems has heretofore been accomplished using traditional instructional techniques and aids. These aids include printed material such as text books, illustrated pamphlets and charts, demonstration models of the type described in U.S. Pat. No. 3,785,064, and audio-visual devices such as slide transparencies and motion pictures. The traditional techniques and the foregoing aids have met with varying degrees of success depending in part on the teaching ability of the instructor, and the familiarity and interest of the students with and in the subject. Nevertheless, since refrigeration systems are inherently complicated and involve various sophisticated concepts, the prior techniques and aids involve a long teaching period and the diligent attention of the students or audience, to provide these persons with a basic understanding of the subject. When sufficient time is unavailable to teach persons the basics of refrigeration systems, and when the conditions are not conductive to facilitate an understanding of this subject using known teaching aids, the latter aids are inadequate to perform their intended function.

SUMMARY OF THE INVENTION

It is an object of the present invention to provide a device for teaching the operation of a refrigeration system.

Another object of the invention is to provide a device for demonstrating in an easily understandable manner, the operation of a refrigeration system.

A more specific object of the invention is to provide a demonstration device for simulating the operation of a heat pump system.

A further object is to provide a demonstration device of the foregoing type which indicates in an easily understandable manner the various refrigeration flow paths in a heat pump, phase changes of the refrigerant, and the nature of the concomitant heat flow.

Yet another object of the invention is to provide a demonstration device of the preceding type which is adaptable to teach the operation of the electrical circuitry associated with a heat pump.

Another object is to provide a device as set forth above which is economical and practicable to manufacture and use.

Other objects will be apparent from the description to follow and from the appended claims.

The foregoing objects are achieved according to the preferred embodiment of the invention by the provision of a demonstration device comprising a first panel having the components and various flow paths of a heat pump depicted thereon in schematic form. The depicted components and flow paths are translucent, and the panel is rear-illuminated by selectively ignitable lamps. The electrical circuitry of the device is programmed to energize the lamps associated with the depicted components to simulate the operation of an actual heat pump and to energize in sequence the lamps behind the schematic refrigerant flow paths to simulate refrigerant flow. Refrigerant phases and temperatures are simulated by means of lamps colored to indicate particular phases and temperatures. Means are provided for selectively changing the rate and direction of the simulated refrigerant flow (a heat pump is a reversible refrigeration system) according to the mode of operation of the actual heat pump being simulated. Supplemental rear-illuminated panels are provided for alternatively indicating the operational mode of the simulated heat pump or the operation of the simulated electrical circuitry used for controlling the energization of the components of the heat pump.

DETAILED DESCRIPTION OF THE PREFERRED EMBODIMENT

Since the preferred embodiment of the invention described below relates to the operation of a simulated heat pump system, it is appropriate to describe the operation of an actual heat pump system. The heat pump can be defined as an air conditioning system arranged and controlled so that it can move heat both to and from a conditioned area. The heat pump accomplishes this basic dual function by virtue of the provision of components which reverse the flow of refrigerant through the system. A typical heat pump comprises a first or indoor refrigerant coil connected to a second or outdoor refrigerant coil by means of appropriate refrigerant lines in which are disposed one or more metering devices, a compressor connected by appropriate refrigerant lines to each of the foregoing coils, and a four-way valve located in the conduits connecting the compressor to the two coils for effecting the reversal of refrigerant flow. Fans are normally positioned near the respective coils for blowing air across the coils to enhance heat transfer between the coils and the ambient air. In modern heat pumps, such as those used for residential buildings, many modes of operation of the system are provided to achieve accurate thermostatic control of the system, defrosting of the outdoor coil to prevent damage to the coil and a reduction in the efficiency of the system, and supplemental heating in the event that the heat pump alone provides inadequate heat under very cold ambient conditions.

When a heat pump is used as an air conditioner for cooling an indoor space, the indoor coil functions as an evaporator and the outdoor coil is a condenser. Low pressure refrigerant absorbs ambient heat from the conditioned space and flows through the indoor coil to the four-way valve. The valve directs the refrigerant gas into a suction line of the compressor. The refrigerant proceeds from the valve to an accumulator and thereafter to the compressor. The compressor compresses the refrigerant, and high-pressure refrigerant gas is discharged from the compressor back to the four-way valve. The four-way valve directs the refrigerant to the outdoor coil where the refrigerant is condensed. Such condensation occurs as the warm refrigerant transfers heat to the ambient air. Assuming the heat pump is the type which incorporates separate metering devices in association with each coil and a check valve bypassing the metering devices, the liquid refrigerant flows through the check valve and bypasses the outdoor coil metering device. The liquified refrigerant proceeds through the liquid line to the metering device for the indoor coil, the latter device reducing the pressure of the refrigerant before the refrigerant enters the evaporator.

When the heat pump is used in its heating mode, heat is extracted from the outside air and is discharged into the conditioned space. The outdoor coil becomes the evaporator which absorbs heat into the refrigeration system, and the indoor coil becomes a condenser which discharges heat to the indoor air. The refrigerant absorbs heat from the ambient outdoor air moving across the outdoor coil, and the evaporated refrigerant flows through the four-way valve into the suction line to the accumulator, and then to the compressor. Compressed, high-pressure gas flows from the compressor back through the four-way valve, and into the indoor coil. Heat is transferred from the hot refrigerant moving through the indoor coil or condenser, and the refrigerant changes phase to its liquid state. The liquid refrigerant from the indoor coil flows through a check valve around the metering device associated with the coil, through the liquid line to a metering device and back into the outdoor coil.

When the indoor temperature is very low, and the heat pump operating in its normal heating mode cannot supply adequate heat to the conditioned space, supplementary heat is normally provided from electrical resistance heaters which operate in conjunction with the heat pump. The size and number of the supplementary electric resistance heaters is determined by the amount of heat required over and above that which the heat pump itself can supply. Normally, several resistance heaters are supplied to be energized in sequence, provided the heat pump and previously energized heaters do not provide the desired amount of heat to the conditioned space. The mode of operation of the heat pump (as a heater or air conditioner) is basically controlled by the four-way valve which is conventionally an electrical solenoid. Other components of the heat pump and the auxiliary devices, including the compressor, the various fans, supplemental heaters, and the means for sequencing and coordinating the operation of the various electrically operated components, are included in an electrical circuit which is under the control of a thermostatic control apparatus and manual controls. The construction of such circuitry, and the manner of its operation, are very similar in both an actual heat pump system and the demonstration device described below, and the operation of the actual and the demonstration device circuitry will be apparent from the following description.

Figure 1:
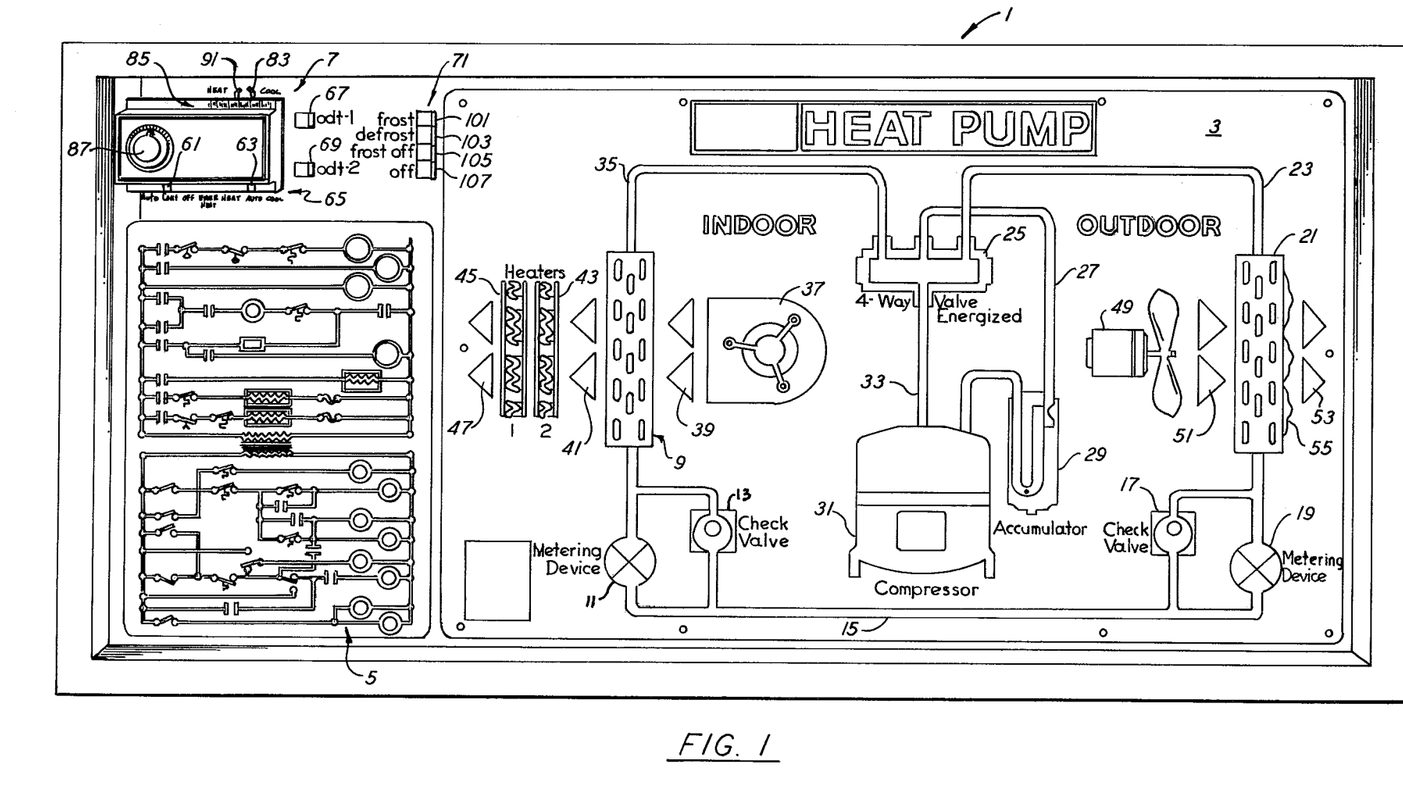
FIG. 1 is a front view of a demonstration device according to the invention.

Referring now to FIG. 1, a display apparatus 1 for simulating the operation of a heat pump system (the term heat pump system as used herein shall refer to the reversible refrigeration circuit known as a heat pump, as well as the auxiliary and supplementary components and electrical circuitry). Display unit 1 includes a main panel 3 on which is depicted in schematic form a heat pump system, a circuit panel 5 on which is depicted a schematic representation of an electrical circuit for controlling the operation of a heat pump of the type shown on panel 3, a thermostat control system 7, and an array of control buttons. The items depicted schematically on main panel 3 are translucent, and electrical lamps are disposed behind the schematic representations for illuminating the respective representations when the lamps are ignited as provided herein. Shown schematically are an indoor refrigerant coil 9, a metering device 11 and a check valve 13 associated with coil 9, a liquid refrigerant line 15, a check valve 17 and a metering device 19 associated with an outdoor refrigerant coil 21, a refrigerant line 23 leading to a four-way valve 25, a suction line 27 leading to an accumulator 29 which is in turn connected to a compressor 31, a high-pressure line 33 leading back to four-way valve 25, and a refrigerant line 35 leading back to coil 9. An indoor fan or blower 37 is shown near indoor coil 9 for simulating the flow of air through coil 9. The flow of air leaving fan 37 is indicated by arrow symbols 39, and the flow of air leaving coil 9 is indicated by arrows 41. Supplemental heaters are illustrated schematically at 43 and 45 respectively, and the flow of air leaving heaters 43, 45 is depicted schematically by arrows 47. An outdoor fan 49 is shown schematically near the outdoor coil 21, the flow of air leaving fan 49 is shown in schematic form by arrows 51, and air leaving coil 21 is shown schematically by arrows 53. The buildup of ice on the outdoor coil is represented pictorially at 55.

The portion of display apparatus 1 disposed behind panel 3 includes various lamps which, when ignited, indicate the simulated flow of refrigerant through the heat pump, the changes in phase of the refrigerant, changes in temperature of the refrigerant and of air flowing across heat-exchange surfaces, and the energization of the various compoents of the heat pump system. Temperature and phase changes are indicated by lights of different colors, and the movement of refrigerant is simulated by sequentially blinking lights. The rate of refrigerant flow is simulated by the frequency at which the various lamps blink. The following color code is advantageously used in display apparatus 1 for indicating the various refrigerant phases and the various relative temperatures:

red — hot refrigerant gas
green — refrigerant liquid
blue — cold refrigerant gas The following color code is used to represent the various relative temperatures of air blown across the two coils:

red — hot air
yellow — ambient air
blue — cold air

The energization of the motor for operating the schematic fans and the schematic compressor are indicated by a yellow light, or by any light since these units are either on or off. The build up of ice shown at 55 is indicted by a white light. The energization of schematic supplemental heaters 43 and 45 is indicated by a red light. Four-way valve 25 has two positions — one which it assumes when it is de-energized, and one which it assumes when it is energized. The energization of valve 25 is indicated by a light behind the word "Energized."

Operation of the schematic heat pump system shown on panel 3 is simulated by the illumination of various lamps in the proper colors and the proper sequence. To simulate the cooling cycle, the electrical controls of display apparatus 1 effect the sequential illumination of green lights behind liquid line 15 to suggest the flow of warm refrigerant liquid from outdoor coil 21 towards indoor coil 9. The blinking green lights indicate a flow of liquid refrigerant through metering device 11, after which blue lights blink to suggest the flow of cold refrigerant gas from the metering device through coil 9. The blinking blue lights further suggest the flow of refrigerant gas through four-way valve 25, into suction line 27, through accumulator 29 and into compressor 31. The lights behind compressor 31 are, of course, illuminated to indicate the operation of the compressor. Red, sequentially blinking lights suggest the flow of hot refrigerant gas through compressor discharge line 33, through four-way valve 25, and thence to line 23. Since refrigerant condenses in coil 21, green blinking lights suggest the flow of liquid refrigerant from condensor 21, through check valve 17 which bypasses metering device 19, to liquid line 15. During the simulated cooling cycle the light behind fan 37 is illuminated to indicate the energization of the fan, and arrows 39 are illuminated yellow to show the air leaving the fan is at the ambient temperature. Arrows 41 are blue to indicate heat transfer from the indoor air to refrigerant flowing through coil 9. The lamp behind fan 49 is also illuminated, and arrows 51 are illuminated yellow to show that they are at the ambient temperature. Arrows 53 are illuminated red to suggest the heating of the air as it passes through condensor 21.

To simulate the operation of the heat pump system in its heating mode, the light behind the word "energized" near the illustrated four-way valve is illuminated. The green lights behind liquid line 15 are again illuminated, but the sequence of the lights is reversed to suggest the flow of liquid refrigerant from the indoor oil towards the outdoor coil. The foregoing green lights indicate flow to metering device 19, after which the refrigerant flow lights are blue to suggest the flashing of the refrigerant to vapor. The blue lights blink in sequence to suggest the flow of cold refrigerant gas through coil 21 (now functioning as an evaporator). The red lights behind line 23 illuminate in sequence to indicate a flow of hot refrigerant gas from evaporator coil 21, through four-way valve 25, and line 27 into accumulator 29 and compressor 31. Red lights continue to blink to show the flow of hot refrigerant gas through line 33, valve 25, and line 35 into indoor coil 9. The color of the lights changes to green at the discharge or lower end of coil 9, and the lights blink in sequence to suggest the flow of liquid refrigerant though check valve 13 into liquid line 15. The lights behind each of fans 37 are ignited to show their energization, and the yellow lights at arrows 39 and 51 show that air to be at ambient temperature. Red lights behind arrows 41 are illuminated to show the warming of the air flowing through condenser coil 9, and arrows 53 are colored blue to indicate the transmission of heat from the outdoor air to refrigerant flowing through coil 21. The red lights behind coils 43 and 45 can be illuminated red to show the actuation of the supplemental heaters, in which case arrows 47 are also illuminated red to show the heating of the air by the heaters.

Panel 5 contains an electrical circuit diagram of the circuitry normally used to control the operation of the various electrical components of the actual heat pump system shown diagrammatically on panel 3. The circuit shown on panel 5 is also substantially the same as the circuit for effecting the illumination of the various lamps disposed behind the schematic representations of components in the heat pump system on panel 3. Those electrical components illustrated in panel 5 which are energizable to operate a component of the heat pump system, are translucent and have disposed behind them electrical lamps which ignite to indicate the simulated energization of the respective components. Since the circuit diagram on panel 5 not only represents the simulated heat pump system electrical circuitry, but also the actual circuitry of the present device (with certain additions for controlling lamp illumination), a description of the operation of the circuit is explanatory of both the actual heat pumps system being simulated and the circuitry of the actual display device. The lamps associated with the components of the depicted circuitry which become illuminated to simulate operation of the respective components are not shown specifically, but all enclosed (with circles or rectangles) components do have lamps disposed behind them.

Panel 5, shown in FIG. 1, is indicative of electrical circuitry used in conjunction with the actual system illustrated on panel 3. As indicated above, that circuitry also indicates the actual operation of apparatus 1. The circuit of apparatus 1 is shown on FIG. 3, and a comparison of the circuits on panel 5 and in FIG. 3, shows that certain additions are included in the circuit of FIG. 3, these additions relating to the controls for the lamps used in conjunction with the various panels.

The control of an actual heat pump system is conventionally accomplished by means of a thermostat and associated electrical and mechanical components which effect the operation of the system in various modes according to the temperature of the space being conditioned and the selected mode of operation of this system. Thermostat control system 7 is used for controlling the operation of the system depicted in panels 3 and 5, and comprises an actual thermostat control system. The controls associated with thermostat control system 7 comprise a fan select switch 61 for selectively placing the fans of the heat pump system in a continuous mode of operation ("CONT") or a fan automatic mode of operation ("AUTO"). Disposed adjacent select switch 61 is a mode selector switch 63 for selectively placing the heat pump system in one of the following modes of operation: cooling ("COOL"), heating ("HEAT"), automatic heating or cooling ("AUTO"), manual emergency heat ("EMER. HEAT") or "OFF". Switches 61 and 63 are manually moveable to select the various modes of operation, and the proper positioning of the switches are aided by indicia 65 disposed beneath them. The existence of very cold conditions which would call for the energization of supplemental heaters simulated by heaters 43 and 45, are simulated by means of the circuits controlled by manually operated switches 67 and 69 which are designated by the indicia "ODT 1" and "ODT 2", these initials standing for outdoor thermostats 1 and 2.

In an actual heat pump system, it is conventional to defrost the outdoor coil in the wintertime when heat is being absorbed from the ambient air by refrigerant flowing through the outdoor coil, such defrost being effected at regular timed intervals. In order to simulate the defrost mode of operation of the system, circuitry controlled by control buttons 71 is provided.

Figure 3:
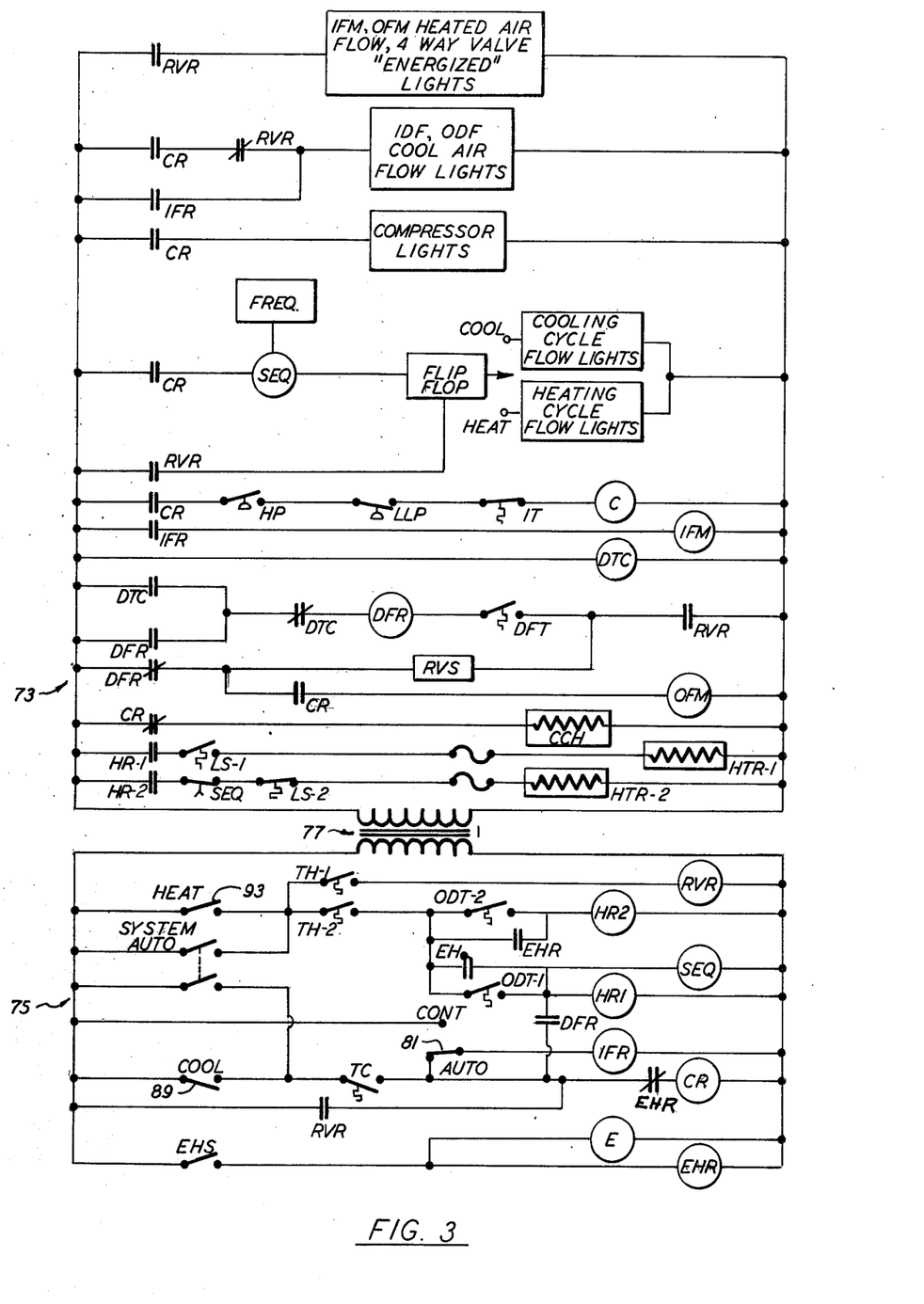
FIG. 3 shows in schematic form electrical circuitry used for operation the device shown in FIG. 1.

Referring now to FIG. 3, which is a circuit diagram of the circuitry for controlling the operation of the various lamps associated with the apparatus of FIG. 1, and with the exception of those portions of the circuit provided exclusively for operating the lights of the apparatus, further represents an actual heat pump system electrical circuit diagram for operating a heat pump as shown on panel 5, the circuit can be seen to include a high voltage section 73 and a low voltage section 75. The two sections are electrically connected by a transformer 77. Section 73 is at normal line voltage, that being 115 volts, but an actual heat pump system would normally be at line voltage or a higher amount such as 230 volts. Low voltage section 75 in each instance would normally be at 24 volts.

The circuit in FIG. 3 can best be explained by a description of the operation thereof. This operation will be explained by a discussion of the effects resulting from the placing of the system in the various modes of operation.

When fan select switch 61 is placed in the "CONT" position and mode selector switch 63 is in the "AUTO" position, the intent is to have the indoor fan 37 operate continuously. This setting of fan select switch 61 effects the setting of a fan select switch 81 to a "CONT" position. This setting causes the energization of the indoor fan relay IFR as well as its associated panel lamp disposed behind the symbol. The energization of relay IFR causes contact IFR to close, which in turn energizes the fan motor lamps. The simulation of the operation of the indoor fan is effected by the illumination of the lamps behind symbol IFM on panel 5, and by the energization of the lamps behind fan 37 in addition, the lights behind arrows 39 and 41 are ignited to show the flow of air at ambient temperature.

When fan select switch 61 is placed in the "AUTO" position, switch 81 assumes its "AUTO" position. When a normally open thermostat cooling switch TC is closed (by virture of the indoor ambient temperature being above that to which switch 83 is set as described below), the same result occurs as when switch 61 is in the "CONT" position. When the ambient temperature falls below that to which switch 83 is set, switch TC opens and the indoor fan shuts off.

In order to place the heat pump system in the cooling mode, fan select switch 61 is placed in the "AUTO" position and switch 63 is placed in the "COOL" position. The cool selector switch 83, disposed opposite temperature indicia 85, is adapted to the slide across those indicia to a desired setting. The setting of cool select switch 83 establishes the temperature at which the heat pump system (both real and simulated) is energized to produce real or simulated cooling. The ambient temperature is measured by a termometer 87. It should be emphasized at this point that thermostat control system 7 is an actual thermostatic control system, and is not adapted in any way for the particular application of this simulated system. For demonstration purposes, it is necessary to set cool select switch 83 to a temperature below the ambient temperature measured by thermometer 87, to place the system in cooling operation.

When switch 63 is set to the cooling mode, switch 89 closes; and when the ambient temperature measured by thermometer 87 rises above the temperature to which cool select switch 83 is set, switch TC closes. When the indoor temperature falls below the temperature to which switch 83 is set, thermostat cooling switch TC closes and indoor fan relay IFR is energized, effecting the closing of contact IFR as described previously, and the illumination of the lamps associated with the indoor fan motor IFM, and the associated air flow lamps. Also, a control relay CR is energized (and the CR symbol is illuminated by its associated lamp), and the normally closed CR contacts are opened, while the normally opened CR contacts are closed. Considering the effects of the energization of control relay CR reading from the bottom of the circuit diagram in FIG. 3 towards the top, various components will be seen to be energized. Thus, normally energized crank case heater CCH symbol is de-energized, an outdoor fan motor relay OFM is energized (and the OFM symbol is illuminated), a contactor coil C symbol is illuminated, and the IFM symbols are illuminated.

The energization of control relay CR effects the energization of other electrical controls which are exclusive to the display apparatus shown in FIG. 1, but are not included in an actual heat pump system since they relate to the illumination of the various display lamps. Thus, continuing upward in FIG. 3, the closing of the next control relay contacts CR causes a sequencer SEQ to energize, as well as a switch "FLIP FLOP", and refrigerant flow lamps disposed behind the refrigerant flow lines depicted on panel 3. As indicated earlier, the colors of those respective lamps change according to the mode of operation of the system, and the flip flop switch is selectively connected to one of two sets of refrigerant flow lights depending on the mode of operation. In the present instance, the flip flop switch moves to the "COOL" position, so the cooling cycle refrigerant flow lamps are electrically connected to the sequencer SEQ. The sequencer can be of any known type, and effect the sequence at which the lamps behind the refrigerant flow line in panel 3 are ignited, to suggest a direction of flow of the refrigerant. Referring back to FIG. 1, when the heat pump is in a cooling mode, refrigerant flow is basically in a clockwise direction. The flip flop is both a color selection switch, and the sequencer SEQ control switch. The setting of the flip flop switch to the "COOL" position effects the illumination of those lamps which indicate that indoor coil 9 is functioning as an evaporator while coil 21 is functioning as a condenser; and further causes sequencer SEQ to make the refrigerant flow lights suggest the cooling cycle.

A frequency control switch FREQ is advantageously connected to sequencer SEQ, for selectively increasing the blinking frequency and the simulated rate of refrigerant flow.

Still continuing in the cooling mode, the closing of the next control relay contacts CR effects the illumination of the lamps behind compressor symbol 31 on panel 3. The closing of the normally opened control relay contact CR at the upper part of the diagram in FIG. 3 causes the illumination of the blue lamps behind arrows 41, and the red lamps behind arrows 53 to show the flow of cool air through the indoor coil and warm air through the outdoor coil, as well as the fan lamps as mentioned above.

The heat pump system shown in panel 3 has one mode of cooling and one mode of heating, although the latter does include supplemental heating capabilities. The temperature at which heating commences is established by the setting of a heat selecting switch 91 which is manually operable in a manner similar to that of switch 83. Basically, when the actual heat pump system is in the heating mode, and the room temperature is below that to which switch 91 is set, the indoor coil transfers heat to the indoor ambient air. Referring again to FIG. 3, when switch 63 is placed in the "HEAT" position, switch 93 closes. Assuming that the indoor ambient air temperature is below the setting of switch 91, normally opened switch TH-1 is closed. The closing of the foregoing switches energizes reversing valve relay RVR and illuminates the light behind the RVR symbol. The energizing of the RVR relay opens and closes various RVR contacts, considered in turn from the bottom of the diagram in FIG. 3 and moving upwardly. The closing of the lowermost RVR contact effects the energization of the control relay CR, to in turn open and close various CR contacts as described previously. Thus, the lamp behind the crank case heater CCH symbol is de-energized; the outdoor fan motor relay OFM symbol is illuminated; the contactor coil C lamp is illuminated; the sequencer and flip flop switch are energized, with the flip flop now energizing the heating refrigerant flow lamps to indicate a counterclockwise refrigerant flow in the circuit of panel 3 and the functioning of the indoor coil as a condenser and of the outdoor coil as an evaporator; the lamps behind the compressor symbol on the display panel 3 are also illuminated; arrows 41 and 53 are illuminated to show a heating of the interior space and a cooling of the air flowing through the outdoor coil; and the fan lamps are lit.

Still considering the effect of the energization of the RVR relay, at the very top of the diagram in FIG. 3, it may be seen that the "Energized" designation near four-way valve 25 in panel 3 is illuminated to show the energization of the fourway valve.

As indicated earlier, the heat pump system shown on panel 3 is provided with supplementary electric heaters 43 and 45, which in a real system would be automatically energized when indoor coil 9 is unable to transfer sufficient heat to the indoor space to raise the indoor temperature to a desired value as established by the setting of switch 91. In order to simulate the low temperature ambient condition, switches 67 and 69, referred to earlier, are provided. When select switch 63 is in the "HEAT" position as mentioned above, and switch 67 is closed, normally opened switch ODT 1 (outdoor thermostat) is closed. Switch 93 is also closed as explained earlier, and in addition normally opened switch TH-2 is closed because the room temperature is below the value set by switch 91. The closing of the latter switches causes heating relay HR1 to be energized and to have the lamp disposed behind the HR1 symbol to be illuminated. In addition to the energization of the relays resulting from the closing of switch 93 mentioned earlier, the HR1 contact is also closed which causes the illumination of the lamp behind heater symbol HTR1 and the illumination of the lamps behind heater 43 in panel 3. A sequencer relay SEQ connected across heater relay HTR1 is also energized. Moreover, the red lights behind arrows 47 are illuminated to show the heating of air flowing through heater 43.

In order to simulate the condition under which even heater 43 does not provide the required heat to reach the temperature set by switch 91, switch 69 can be manually depressed. This effects the closing of normally opened switch ODT2, to energize heater relay HR2, to in turn close contact HR2 which results in the illumination of the lamps behind heater symbol HTR2 and those behind heater 45 in panel 3. A sequence relay SEQ is also energized when switch ODT-1 closes, as well as the lamp behind the SEQ symbol, and this sequencer provides a delay in the energization of symbol HTR2 and the illumination of the lights behind heater 45 in panel 3, by virtue of its control over sequence switch SEQ after contacts HR2 close.

The heat pump system shown schematically on apparatus 1 is additionally provided with means for providing emergency heating in the event that the heat pump itself for some reason fails, such as in the event of a compressor's breakdown. In order to simulate this condition, select switch 63 can be set to an emergency heat setting "EMER HEAT". Such setting causes a switch EHS (emergency heat) to close, which in turn energizes emergency heat relay EHR and relay E, as well as the lamps disposed behind these symbols. The EHR relay in turn closes the EHR contacts bypassing the the normally opened ODT-1 and ODT-2 switches to energize relays HR1 and HR2 and their respective lights. These relays in turn effect the closing of contacts HR1 and HR2 and the energization of sequencer SEQ. The net result, as described immediately above, is the illumination of the lights behind heaters 43 and 45 on display panel 3, and the red illumination of arrows 47, to show that the electrical heaters would provide heat even in the event that the heat pump itself is out of order (provided of course, that the temperature to which switch 91 is set is above the temperature measured by switch TH-2. The energization of relay E causes a light in thermostat control 7 to illuminate as a warning signal that the emergency mode is in effect.

It was mentioned above that in a real heat pump, when in its heating mode, frost often builds up on the outdoor coil, so that means must be provided for defrosting the coil. In order to simulate a defrost mode, a series of switches 71 are provided. In order to show the build up of frost, a frost button 101 is depressed to cause the illumination of lamps behind frost symbol 55 on panel 3 to illuminate. To simulate the defrost mode, "DEFROST" button 103 is depressed. This action causes a relay DFR be energized (in an actual system, a timer would accomplish this function, which in turn would close normally open contacts DTC, and energize defrost relay DFR). The energized defrost relay DFR opens the normally closed contact DFR to de-energize the four-way reversing valve solenoid RVS, and the "Energized" lamp behind panel 3 goes out. The reversal of the refrigerant flow is thereby simulated. The contacts DFR associated with relay HR1, the heater 43 lamps, and the associated air flow arrow lamps are also energized. The defrosting of coil 21 is simulated by the depression of "FROST OFF" button 105, which turns off the lamps associated with frost symbol 55. The conclusion of the defrost cycle demonstration is effected by depressing "OFF" button 107, to deenergize relay DFR and the components controlled thereby.

The system can be set so that it is automatically placed in the heating or cooling modes, by moving switch 63 to the "AUTO" position. This action closes double throw switch "SYSTEM AUTO" in FIG. 3, to effectively place the system under the control of thermostatically operated switches TC, TH-1, and TH-2.

Other symbols shown on panel 5 (and in FIG. 3) are there for illustration only, since they would often be included in actual heat pump circuits, but are not functional in the demonstration device. Of course, these items could be rendered functional by appropriate modification of the circuitry of the described apparatus.

Figure 2:
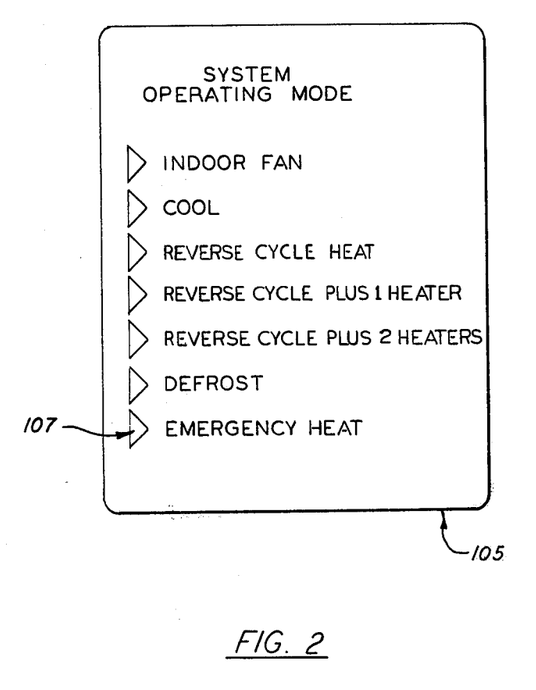
FIG. 2 is a front view of an auxiliary supplemental panel for use on the apparatus shown in FIG. 1.

Panel 5 can be replaced with panel 109 shown in FIG. 2, if it is not desired to explain the operation of the circuitry of the simulated system, or to aid in explaining the mode in which the heat pump system is operating at any time. Panel 109 is provided with indicia indicating the mode in which the system is operating, and includes translucent designators 111 under which electric lamps are disposed. The lamps are electrically connected to the circuitry of the system to ignite in coordination with the corresponding simulated mode of operation of the system. Since it is intended that panels 5 and 109 be interchangeable, the panels are preferably opaque in those areas where lamps only associated with the other panel are positioned, to avoid the confusion of additional illuminated lamps. Where possible, lamps should be located relative to panels 5 and 109 so that common lamps could be used with the two panels. The means for securing the panels to the device should facilitate the easy installation and removal of the panels. Screws, hooks, or clamps would be appropriate.

The invention has been described in detail with particular reference to the preferred embodiment thereof, but variations and modifications within the spirit and scope of the invention may occur to persons skilled in the art to which the invention pertains.

I claim:

1. A demonstration device for demonstrating the operation of an actual refrigeration system, said device comprising:
   display means comprising a display of a schematic representation of the actual refrigeration system, said representation including symbols of: heat exchange apparatus, apparatus for changing the pressure and temperature characteristics of the refrigerant, refrigerant flow lines, and apparatus for controlling the direction of refrigerant flow;
   apparatus illuminating means associated with said display means for selectively illuminating said apparatus symbols;
   refrigerant flow line illuminating means associated with said refrigerant flow line symbols for selectively illuminating said flow line symbols to simulate refrigerant flow and the phase state and temperature of the refrigerant; and
   electrical control means for selectively simulating at least one mode of operation of the refrigeration system, said control means including:
      first electrical circuit means for effecting energization of the apparatus illuminating means to illuminate the symbols of said apparatus corresponding to the apparatus energized when the actual refrigeration system operates in the simulated mode of operation; and
      second electrical circuit means for effecting energization of the refrigerant flow line illuminating means to simulate the direction of movement of refrigerant in the flow lines and the phase state and temperature of the refrigerant in the flow lines corresponding to the actual direction of refrigerant flow and the phase state and temperature of the refrigerant, when the actual refrigeration system operates in the simulated mode of operation.

2. The invention according to claim 1 wherein said display of a schematic representation of the actual refrigeration system comprises a panel having translucent symbols of said various apparatus; and
   wherein said apparatus illuminating means comprise electrical lamps associated with the respective translucent symbols for illuminating the respective symbols when the respective lamps are energized.

3. The invention according to claim 1 wherein said display of a schematic representation of the actual refrigeration system comprises a panel having translucent symbols of the refrigerant flow lines; and
   wherein said refrigerant flow line illuminating means comprises a plurality of flow line lamps disposed in linear fashion in association with said translucent flow line symbols for illuminating the respective portions of the flow line symbols with which the respective lamps are associated when the lamps are energized; and
   wherein said second electrical circuit means comprises sequencing means electrically connected to said flow line lamps to effect the sequential illumination of said lamps to simulate the flow of refrigerant through the flow lines.

4. The invention according to claim 3 wherein said second electrical circuit means further includes frequency control means electrically connected to said sequencing means for controlling the frequency at which said sequencing means effects the sequential illumination of said lamps, to simulate various rates of refrigerant flow in the flow lines.

5. The invention according to claim 3 wherein said plurality of flow line lamps comprises a plurality of sets of colored lamps, the colors of the respective sets representing different phase states and temperatures of refrigerant at various places in the simulated refrigeration system; and
   wherein said second electrical circuit means comprises switching means for energizing the sets of colored lamps corresponding to the refrigerant phase states and temperatures, existing in an actual refrigerant system whose operation is being simulated.

6. The invention according to claim 1 wherein the actual refrigeration system includes electrically energizable apparatus and electrical circuitry for operating the electrically energizable apparatus, the circuitry including electrical components connected to component parts of the apparatus for energizing the respective component parts of the apparatus in response to energization of the electrical component, and wherein said display means further comprises:
   a display of a schematic representation of the electrical circuitry of the actual refrigeration system, said representation including symbols of the electrical components of the circuitry; and
   wherein said device further includes circuitry illuminating means associated with said electrical component symbols for selectively illuminating said electrical component symbols; and
   wherein said electrical control means further includes third electrical circuit means for effecting energization of said circuitry illuminating means to simulate the energization of said electrical circuitry in said one mode of operation of the refrigeration system.

7. The invention according to claim 6 wherein said display of a schematic representation of the electrical circuitry of the actual refrigeration system comprises a circuit diagram panel having translucent symbols of the electrical components of the circuitry; and
   wherein said circuitry illuminating means comprises electrical lamps associated with the respective symbols for illuminating the symbols when the respective lamps are energized.

8. The invention according to claim 7 wherein the actual refrigeration system has a plurality of modes of operation, and said display means further comprises:
   a mode representation panel having mode representations indicating the respective modes of operation of the actual refrigeration system, and translucent indicators associated with the mode representations; and said device further includes electrical lamps associated with said translucent indicators for illuminating the indicators when the respective lamps are energized, said lamps being interspaced with the lamps for illuminating the electrical component symbols on said circuit diagram panel; and wherein said electrical control means includes electrical circuit means for effecting energization of the lamp opposite the indicator associated with the mode representation corresponding to the simulated mode of operation of the actual refrigeration system; and wherein said device includes a support frame for housing said lamps, and said mode representation panel and said circuit diagram panel are interchangeably mountable on said frame over said interspaced lamps.

9. The invention according to claim 1 wherein the actual refrigeration system has a plurality of modes of operation, and said display means further comprises:

a display of mode representations indicating the respective modes of operation of the actual refrigeration system; and wherein said device further includes mode representation illuminating means associated with said mode representations for selectively illuminating said mode representations; and wherein said electrical control means further includes fourth electrical circuit means for effecting energization of said mode representation illuminating means to indicate the specific mode of operation of the refrigeration system being simulated by the device.

10. Apparatus for demonstrating the operation of an actual heat pump system, said apparatus comprising:

a first panel having a schematic representation of the actual heat pump system; the representation including translucent symbols of an indoor coil, an outdoor coil, a compressor, a four-way valve, metering devices associated with said coils, refrigerant flow lines connecting the heat pump components to form a heat pump, and fans associated with said coils;

a second panel having a circuit diagram of the electrical system for controlling the energization of electrically energizable apparatus of the heat pump, the circuit diagram including translucent symbols of energizable electrical components of the circuit;

electric lamps associated with the respective translucent symbols on said first and second panels for illuminating the respective symbols when the lamps are energized, said lamps including a plurality of aligned lamps associated with the refrigerant flow line symbols; and electric control means for selectively simulating heating and cooling modes of operation of the heat pump system, said control means comprising:

first electric circuit means actuable for selectively illuminating the lamps associated with the symbols of the indoor coil, the outdoor coil, the compressor, the four-way valve, and the fans associated with the coils, according to the mode of operation of the actual refrigeration system;

second electric circuit means electrically associated with said first circuit means and illuminating the lamps associated with the refrigerant flow line symbols in first or second sequences to simulate the direction of refrigerant flow according to the simulated mode of operation of the actual heat pump system; and thermostatic control means for actuating said first and second circuit means, said thermostatic control means including means for selecting the mode of operation simulated by said apparatus, and the respective temperatures at which said first and second circuit means are actuated.

11. The invention according to claim 10 wherein the plurality of aligned lamps associated with the refrigerant flow line symbols comprise a plurality of sets of colored lamps, the colors of the respective sets representing different phase states and temperatures of the simulated refrigerant flow; and said second electric circuit means includes switching means for energizing the sets of colored lamps corresponding to the refrigerant phase state and temperature in the simulated mode of operation of the actual refrigeration system.

12. The invention according to claim 10 wherein said second electric circuit means further includes frequency control means for controlling the rate at which said lamps associated with the refrigerant flow lines are illuminated in sequence, to control the simulated rate of refrigerant flow.

13. The invention according to claim 10 wherein said first panel further includes translucent frost symbols of frost build-up on the outdoor coil; and said electric lamps include lamps associated with said symbols of frost; and said first circuit means includes means for selectively energizing said frost symbols, and defrost mode control means for selectively simulating the defrost of the outdoor coil; and said second electric circuit means includes means for actuating the illumination of the lamps associated with the flow line symbols in the sequence corresponding to the cooling mode of operation of actual refrigeration system in response to actuation of said defrost mode control means.

* * * * *